May 24, 1949.  R. R. BOSHAW  2,471,191
COMBINATION TOOL
Filed April 6, 1946

Inventor
Ruby R. Boshaw
by Barthel + Bugbee
Att'y's

Patented May 24, 1949

2,471,191

UNITED STATES PATENT OFFICE 2,471,191

COMBINATION TOOL

Ruby R. Boshaw, Detroit, Mich.

Application April 6, 1946, Serial No. 660,114

6 Claims. (Cl. 279—77)

This invention relates to combination tools and in particular to such tools having a common handle with insertable and detachable implements.

One object of this invention is to provide a combination tool having improved means for detachably holding an implement in a common handle.

Another object is to provide a combination tool wherein the implements are held more powerfully and without danger of accidental release even when employing implements subjected to sudden jolts, such as hammers or hatchets.

Another object is to provide a combination tool having implements with shanks hooking deeply into the common handle and having a positive locking device located remote from the inner end of the shank of the implement whereby a powerful locking leverage is exerted upon the implement and handle, preventing accidental dislodgement.

Another object is to provide a combination tool as set forth in the preceding objects wherein the implement is provided with a strong and effective abutment portion located adjacent the locking device so as to more powerfully support the implement against the stresses encountered in its use.

Another object is to provide a combination tool, as set forth in the preceding objects, wherein the locking device is located transversely in the handle adjacent the end thereof facing the implement.

Another object is to provide a combination tool wherein the various implements have shanks of similar configuration and which are capable of being stored and carried in a convenient case, such as a sheath, pocket or envelope of canvas, leather or other suitable material.

Other objects and advantages of the invention will become apparent during the course of the following description of the accompanying drawings, wherein:

Figure 1 is a side elevation of a combination tool according to a preferred embodiment of the present invention, with certain portions of the handle broken away to disclose the interior construction more clearly;

Figure 2 is a front elevation of the combination tool shown in Figure 1;

Figure 3 is a side elevation of the shank of an implement for use with the combination tool of this invention;

Figure 4 is a front elevation of Figure 3;

Figure 6 is a cross-section taken along the line 6—6 in Figure 1;

Figure 7 is a cross-section taken along the line 7—7 in Figure 1;

Figure 8 is a longitudinal section taken along the line 8—8 in Figure 1; and

Figure 9 is a reduced side elevation showing other implements which may be inserted in the handle of the combination tool of this invention.

Figure 5:
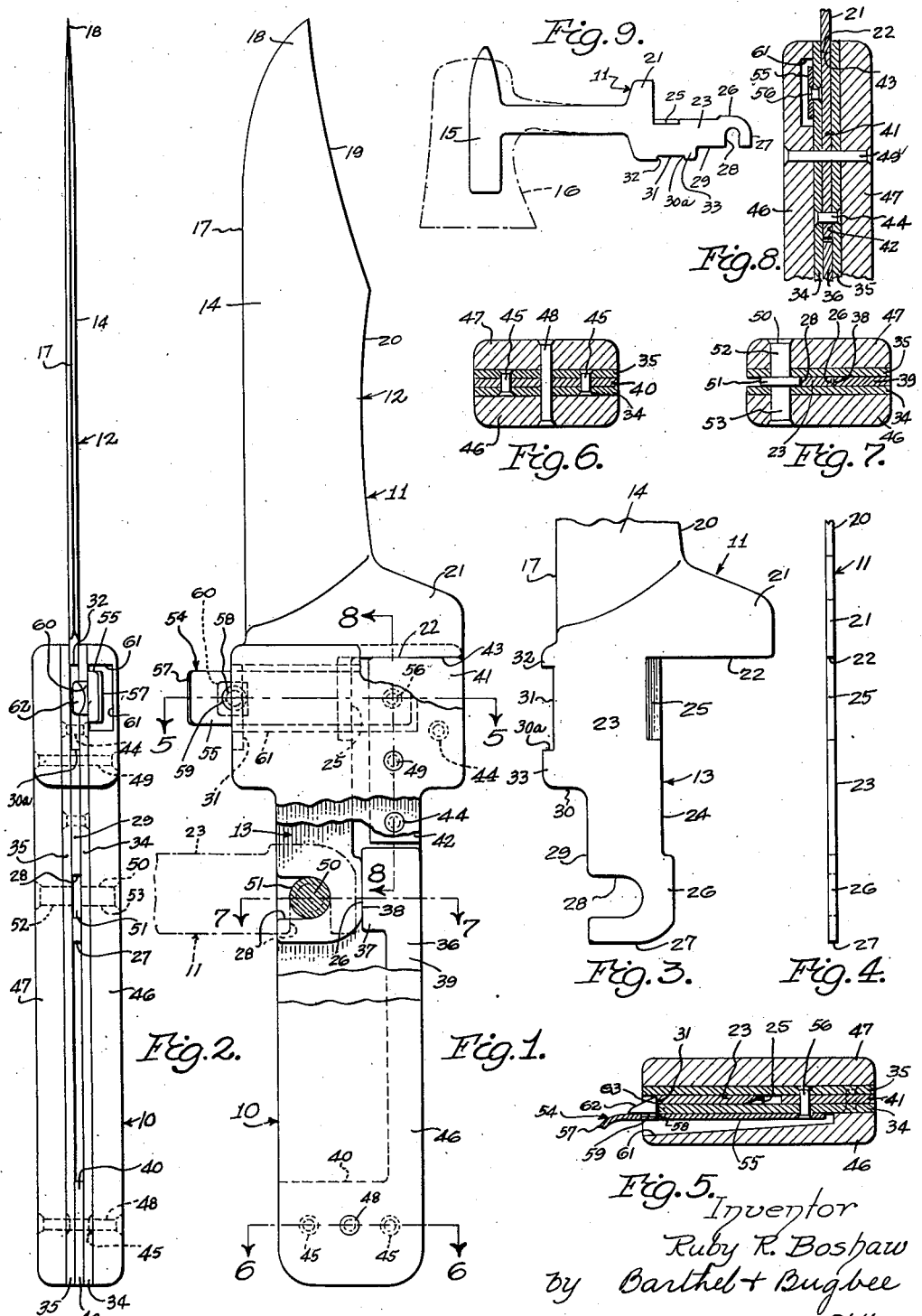
Figure 5 is a cross-section taken along the line 5—5 in Figure 1.

Referring to the drawings in detail, Figure 1 shows a combination tool according to a preferred embodiment of the invention and consisting generally of a handle 10 and an implement 11 having a working portion 12 and a shank 13 insertable into the handle 10. It will be understood that various types of implements 11 may be used with the handle 10, such as the knife 14 shown in Figure 1, the hammer 15 shown in Figure 9. Alternatively also, other implements may be employed such as the axe 16 shown in chain lines in Figure 9, or still other implements (not shown) such as screw drivers, files, rasps, saws, nail or tack lifters, chisels, augurs or gimlets, punches, can openers, cleavers, wrenches, or the like. It will be further understood, however, that all such implements, while differing in their working portions 12, will have a common shank 13 for insertion into the common handle 10.

For purposes of illustration, an implement 11 consisting of a hunting knife will be described. The hunting knife, as previously stated, consists of a shank 13 and a working portion 12. The latter comprises a blade 14 having a sharpened edge 17 and a pointed tip 18, together with the usual blunt rear edges 19 and 20. The shank 13 includes a laterally projecting abutment portion 21 with an abutment edge 22 (Figure 3) approximately perpendicular to the holding portion 23. The latter is provided at its rearward edge 24 with a bevelled portion 25 adjacent the abutment edge 22. The edge 24 is further provided with a slightly projecting abutment portion 26 which extends down to the end 27 of the holding portion 13. The end 27 contains a curved notch or recess 28 extending inwardly from the forward edge 29 above which is a projecting portion 30 containing a longitudinal notch 30a with a locking edge 31 for receiving a locking device, to be described later. The notch 30a is bounded by spaced projecting portions 32 and 33.

The handle 10 consists of a pair of spaced side plates 34 and 35 separated at their lower portions by a J-shaped member 36 having a forwardly projecting abutment portion 37 with a contact edge 38 and an elongated spring arm 39 connected to an anchorage portion 40 projecting therefrom and occupying the full width of the blade 10. The side plates 34 and 35 are also interconnected at their upper and rearward portions by an abutment plate 41 of approximately rectangular shape with a downwardly projecting portion 42 (Figure 1). The upper edge 43 of the abutment portion 41 engages the corresponding abutment edge 22 of the shank 13. The abutment portion 41 is secured to the side plates 34 and 35 by fasteners 44. The anchorage portion 40 (Figure 6) is likewise secured to the side plates 34 and 35 by fasteners 45. The handle 10 is provided with hand grips 46 and 47 secured respectively to the side plates 34 and 35 by long fasteners 48 and 49 (Figures 2, 6 and 8). Extending through the hand grips 46 and 47 and the side plates 34 and 35 is a combined fastener and pivot pin 50 having an enlarged central portion 51 lying between the reduced diameter portions 52 and 53 (Figure 7). The pivot pin enlargement 51 thus lies in an open-sided socket bounded by the side plates 34 and 35 and the J-shaped member 36.

The locking device 54 by which the implement 11 is releasably held in the handle 10 includes a spring arm 55 secured at its rearward end to the side plate 34 by a fastener 56 (Figures 1, 5 and 8). The outer end 57 of the spring arm 55 is bent for convenience of manipulation by the thumb of the user, and is bored as at 58 to receive the shank 59 of a detent 60 (Figure 1), the shank 59 being upset to secure the detent 60 to the spring arm 55. The latter is housed in a transverse cavity 61 within the hand grip 46 near the upper end thereof. The detent 60 is bevelled as at 62 toward an abutment edge 63 adapted to enter the notch 30a of the implement 11 and engage the bottom locking edge 31 thereof In the use of the invention, to insert one of the implements 11, the holding portion 23 of the shank 13 thereof is inserted above the pivot pin 50 approximately at right angles to the handle 10, as indicated by the chain lines in Figure 1, and pushed downwardly in this position until the notch 28 engages the enlarged portion 51 of the pivot pin 50. The implement 11 is then swung upwardly into the solid line position of Figure 1 into the space between the front edges of the side plates 34 and 35, the bevelled portion 25 of the holding portion 23 engaging the bevelled portion 62 of the detent 60 and forcing the latter transversely toward the hand grip 46 (Figures 2 and 5), thereby urging the spring arm 55 outwardly. As the implement 11 reaches a position of alignment with the handle 10 (Figure 1), the abutment portion 63 of the detent 60 snaps in behind the locking edge 31 at the bottom of the notch 30a in the holding portion 23, the abutment edge 22 engages its corresponding abutment edge 43, and the implement 11 is locked in the position shown in Figures 1 and 5. Meanwhile, the abutment portion 36 and spring arm 39 have swung rearwardly and returned to the position shown in Figure 1 with the abutment edges 26 and 38 in engagement. Thus, the implement 11 is firmly locked in the handle 10 at widely separated locations, namely at the pivot pin 50 and the detent 60.

To remove the implement 11 from the handle 10, the thumb is placed upon the curved portion 57 of the spring arm 55 while the handle 10 is firmly gripped in the hand of the user, forcing the detent 60 to the right (Figure 2) out of engagement with the locking edge 31 of the holding portion 23. The user then places his hand against the rear edge 20 of the implement 11 and swings it downwardly around the pivot pin 50 into the chain line position shown in Figure 1, releasing the detent device 54 when this position has been reached. The implement 11 may then be shifted upward to lift the notch 28 in the holding portion 23 out of engagement with the pivot pin 50, whereupon the implement 11 may be pulled sidewise and completely detached from the handle 10. Another implement having a shank 13 of like construction, such as the hammer 15 or axe 16 (Figure 9) may be inserted in the previously described manner and similarly detached after being used. The various implements 11, 15 and 16 together with the handle 10 may then be returned to their case. Alternatively, the knife 14 may be normally retained in the handle 10 and this assembly carried in a belt sheath of conventional construction (not shown), the remaining implements being carried in a separate case (not shown).

While I have shown and described my invention in detail, it is to be understood that the same is to be limited only by the appended claims, for many changes may be made without departing from the spirit and scope of my invention.

What I claim is:

1. A combination tool comprising a handle having a longitudinal socket therein, a pivot member in said socket, a detent in said handle remote from said pivot member, and an implement having an elongated shank insertable in said socket and having a recess engageable with said pivot member and a locking portion engageable with said detent, said handle having a rigidly mounted abutment member therein with abutment portions extending both longitudinally and transversely of said handle, and said implement having both longitudinally and transversely extending abutment portions engageable with the corresponding abutment portions of said abutment member.

2. A combination tool comprising a handle having a longitudinal socket therein, a pivot member in said socket, a detent in said handle remote from said pivot member, and an implement having an elongated shank insertable in said socket and having a recess engageable with said pivot member and a locking portion engageable with said detent, said handle having a rigidly mounted abutment member disposed adjacent the implement end of said handle and having abutment portions extending both longitudinally and transversely of said handle, and said implement having both longitudinally and transversely extending abutment portions engageable with the corresponding abutment portions of said abutment member.

3. A combination tool comprising a handle having a longitudinal socket therein, a pivot member in said socket, a detent in said handle remote from said pivot member, and an implement having an elongated shank insertable in said socket and having a recess engageable with said pivot member and a locking portion engageable with said detent, said implement having and approximately right-angled cutaway abutment portion, and said handle having a rigidly-mounted approximately right-angled abutment member engageable with said right-angled cutaway abutment portion.

4. A combination tool comprising a handle having a longitudinal socket therein, a pivot member in said socket, a detent in said handle remote from said pivot member, and an implement having an elongated shank insertable in said socket and having a recess engageable with said pivot member and a locking portion engageable with said detent, said handle having a rigidly-mounted abutment member therein and said implement having an abutment portion engageable with said abutment member, said handle having a transverse cavity and said detent comprising a spring arm disposed in said cavity and secured at one end to said handle and having a locking projection near its opposite end engageable with said implement shank on the opposite side thereof from said abutment member.

5. A combination tool comprising a handle having a longitudinal socket therein, a pivot member in said socket, a detent in said handle remote from said pivot member, and an implement having an approximately L-shaped elongated shank with longitudinal and transverse portions insertable in said socket and having a recess engageable with said pivot member and a locking portion engageable with said detent, said handle having a rigidly-mounted abutment member therein and said implement having an abutment portion engageable with said abutment member, the transverse portion of said L-shaped shank having an abutment edge engageable with said handle, said handle having a transverse cavity and said detent comprising a spring arm disposed in said cavity and secured at one end to said handle and having a locking projection near its opposite end engageable with said implement shank on the opposite side thereof from said abutment member.

6. A combination tool comprising a handle having a pair of spaced side members, a pivot member secured to said side members and extending through the space therebetween, a detent secured to one of said side members and extending into the space therebetween, and an implement having an elongated shank insertable into the space between said side members and having a hook portion detachably engageable with said pivot member, said detent having an inclined portion thereon and said implement shank having an inclined edge engageable with said inclined detent portion whereby to push said detent aside during entry of said shank into said handle space.

RUBY R. BOSHAW.

REFERENCES CITED

The following references are of record in the file of this patent:

UNITED STATES PATENTS

| Number | Name | Date |
| --- | --- | --- |
| 134,011 | Smith | Dec. 17, 1872 |
| 997,683 | Lutz | July 11, 1911 |
| 2,018,603 | Case et al. | Oct. 22, 1935 |